Patented Sept. 15, 1942

2,295,618

UNITED STATES PATENT OFFICE 2,295,618

RECOVERY OF ALIPHATIC POLYHYDROXY COMPOUNDS

Carl Wulff and Helmut Ohlinger, Ludwigshafen-on-the-Rhine, Germany, assignors, by mesne assignments, to General Aniline & Film Corporation, New York, N. Y., a corporation of Delaware No Drawing. Application May 21, 1938, Serial No. 209,360. In Germany May 29, 1937

3 Claims. (Cl. 202—57)

The present invention relates to aliphatic polyhydroxy compounds and a process of recovering same.

It is already known that on acting with basic condensing agents on acetaldehyde, aldol is obtained from which 1,3-butyleneglycol can be produced by catalytic hydrogenation.

We have now found that aliphatic polyhydroxy compounds of high molecular weight which contain 6, 8 or even a greater number of carbon atoms in the molecule and, in addition, 1 hydroxyl group for each 2 carbon atoms can be obtained by subjecting to a careful distillation the residue left after the distillation of 1,3-butylene glycol which has been obtained by hydrogenating crude aldol. The aliphatic polyhydroxy compounds thus obtained may further be purified and cut into fractions without decomposition by another distillation.

According to their carbon and hydrogen contents, their molecular weight and the hydroxyl number, the polyhydroxy compounds constitute mixtures of hexanetriols and octanetetrols, so far unknown in the literature. They are colorless and practically odorless viscous liquids of the nature of glycerine. They are soluble in water and alcohol, but insoluble in ether and are useful in particular as a substitute for glycerine for all purposes for which the latter is used.

The distillation of the residue left after the distillation of 1,3-butylene glycol may be carried out for example under reduced pressure, such as pressures below 600 millimeters (mercury gauge), preferably even at very low pressures, such as below 20 millimeters. In this distillation also steam or other inert gases may be applied. A further method of distilling the residue is distillation with steam or superheated steam. As the acetals contained in the residue of 1,3-butylene glycol can hardly be distilled without undergoing decomposition, their conversion into the corresponding alcohols is preferably effected by treating the residue left after the distillation of 1,3-butylene glycol either directly or after a previous distillation in vacuo with an aqueous solution of mineral acids, especially with aqueous sulphuric acid, before subjecting it to the careful distillation. The acid, after having destroyed the acetals may be removed by forming an insoluble salt thereof or by neutralizing.

The following example will further illustrate how this invention may be carried out in practice but the invention is not restricted to this example.

Example 8 kilograms of the residue from the distillation of 1,3-butylene-glycol obtained from crude aldol by hydrogenation are distilled in vacuo with a pressure of from 1 to 3 millimeters (mercury gauge), ordinary steam being led in at the same time. The tough residue which results contains the salts used for the preparation of the aldol.

The distillate is diluted with water to give twice to three times its volume and, for the destruction of acetals, is heated for some hours with from 1 to 3 per cent of concentrated sulphuric acid with the simultaneous introduction of steam. The sulphuric acid is then removed by the addition of a calculated amount of lime or barium hydroxide, the precipitate is filtered off by suction and the solution given a water-clear appearance by a treatment with animal charcoal. After evaporation of the water the remaining mixture of polyhydroxy compounds is subjected to a fractional distillation in vacuo. After a small amount of first runnings which mainly consist of butylene glycol, there are obtained from 3500 to 4000 grams of a fraction which boils at between 125° and 155° centigrade at a pressure of 0.5 millimeter (mercury gauge) and consists of aliphatic polyhydroxy compounds of high molecular weight. The said fraction has the following analysis:

| | |
|---|---:|
| C | 54.04 |
| H | 10.50 |
| Molecular weight | 154–175 |
| Bromine value | 0 |
| Hydroxyl value | 1,190 |
| Aldehyde contents_____per cent__ | 0.0 |
| Acetal contents_____do____ | 0.5 |

The preparation of the polyhydroxy compounds may also be effected in the following manner:

2 kilograms of the residue from the distillation of 1,3-butylene-glycol obtained from crude aldol by hydrogenation are diluted with 2 liters of water, and the insoluble resinous residue is removed by filtration. 1 to 3 per cent of concentrated sulphuric acid are then added, and the whole is heated to boiling for from 8 to 10 hours, while allowing steam to pass through the boiling solution. The aldehydes, formed by decomposition of the acetals present, are thus distilled off together with water. The sulphuric acid is removed by the addition of lime, and the whole worked up in the manner described above. There are obtained from 700 to 800 grams of the above defined polyhydroxy compounds, boiling at between 125 and 155° C. at a pressure of 0.5 millimeter (mercury gauge).

What we claim is:

1. A process of producing aliphatic polyhydroxy compounds containing at least 6 carbon atoms and 1 hydroxyl group for each 2 carbon atoms which consists in treating the residue left after the distillation of 1,3-butylene-glycol which has been obtained by hydrogenating crude aldol, with a dilute aqueous mineral acid, distilling off the aldehydes formed, removing the mineral acid and subjecting the residue to a distillation under reduced pressure.

2. A process of producing aliphatic polyhydroxy compounds containing at least 6 carbon atoms and 1 hydroxyl group for each 2 carbon atoms which consists in subjecting the residue left after the distillation of 1,3-butylene-glycol, which has been obtained by hydrogenating crude aldol, to a distillation under reduced pressure, treating the distillate with a dilute aqueous mineral acid, distilling off the aldehydes formed, removing the mineral acid and subjecting the residue to a distillation under reduced pressure.

3. A process of producing aliphatic polyhydroxy compounds containing at least 6 carbon atoms and 1 hydroxyl group for each 2 carbon atoms which consists in treating the residue left after the distillation of 1,3-butylene-glycol which has been obtained by hydrogenating crude aldol, with dilute sulphuric acid, evaporating the aldehydes formed, removing the sulphuric acid and subjecting the residue to a distillation under reduced pressure.

CARL WULFF.
HELMUT OHLINGER.